United States Patent [19]

Jenkins, III et al.

[11] Patent Number: 4,588,790
[45] Date of Patent: * May 13, 1986

[54] METHOD FOR FLUIDIZED BED POLYMERIZATION

[75] Inventors: John M. Jenkins, III, So. Charleston, W. Va.; Russell L. Jones, Chapel Hill, N.C.; Thomas M. Jones, So. Charleston, W. Va.; Samil Beret, Danville, Calif.

[73] Assignee: Union Carbide Corporation, Danbury, Conn.

[*] Notice: The portion of the term of this patent subsequent to Sep. 24, 2002 has been disclaimed.

[21] Appl. No.: 643,884

[22] Filed: Aug. 24, 1984

Related U.S. Application Data

[63] Continuation-in-part of Ser. No. 594,962, Apr. 3, 1984, Pat. No. 4,543,399, which is a continuation of Ser. No. 361,547, Mar. 24, 1982, abandoned.

[51] Int. Cl.⁴ .............................................. C08F 2/34
[52] U.S. Cl. ...................................................... 526/70
[58] Field of Search ..................... 526/67, 68, 70, 87, 526/88

[56] References Cited

U.S. PATENT DOCUMENTS

| | | |
|---|---|---|
| 3,254,070 | 5/1966 | Roeieu . |
| 3,256,263 | 6/1966 | Wisseroth . |
| 3,298,792 | 1/1967 | Didrusco . |
| 3,300,457 | 1/1967 | Schmid . |
| 3,625,932 | 12/1971 | Green . |
| 3,652,527 | 3/1972 | Trieschmann . |
| 3,922,322 | 11/1975 | Dormenval . |
| 3,944,534 | 3/1976 | Sennari . |
| 3,965,083 | 6/1976 | Jezl . |
| 3,970,611 | 7/1976 | Jezl . |
| 3,971,768 | 7/1976 | Peters . |
| 4,012,573 | 3/1977 | Trieschmann . |
| 4,408,024 | 10/1983 | Matsuyama . |
| 4,442,271 | 4/1984 | Rau . |

FOREIGN PATENT DOCUMENTS

| | | |
|---|---|---|
| 0021605 | 1/1981 | European Pat. Off. . |
| 0071430 | 2/1983 | European Pat. Off. . |
| 0100879 | 2/1984 | European Pat. Off. . |
| 2139182 | 2/1972 | Fed. Rep. of Germany . |
| 55-045744 | 3/1980 | Japan . |
| 460881 | 11/1981 | Japan . |

*Primary Examiner*—Paul R. Michl
*Attorney, Agent, or Firm*—Clement J. Vicari

[57] ABSTRACT

A continuous gas fluidized bed process is disclosed for the production of polymer from monomer wherein a gaseous stream comprising monomer is passed through a fluidized bed in a reaction zone in the presence of catalyst under reactive conditions, withdrawing from the reaction zone polymeric product and a stream comprising unreacted gases and solid particles, cooling the stream and recycling the cooled stream to the reaction zone together with sufficient additional monomer to replace monomer polymerized and withdrawn as polymer product, and wherein at least a part of the recycle stream is cooled to condense a portion thereof and form a liquid-containing mixture wherein the weight ratio of liquid to solid particles is not less than about two to one, and introducing the mixture into the reaction zone wherein the liquid in the mixture is vaporized.

33 Claims, 4 Drawing Figures

METHOD FOR FLUIDIZED BED POLYMERIZATION

This application is a continuation-in-part of U.S. application Ser. No. 594,962, filed Apr. 3, 1984, now U.S. Pat. No. 4,543,399; which is, in turn, a continuation of U.S. application Ser. No. 361,547 filed Mar. 24, 1982 and now abandoned.

BACKGROUND OF THE INVENTIION

The discovery of the fluidized bed process for the production of polymers provided a means for producing a diversity of polymers, e.g., polyolefins such as polyethylene, with a drastic reduction in capital investment and a dramatic reduction in energy requirements as compared to then conventional processes. The present invention provides a means for even greater savings in energy and capital cost by affording a simple and efficient means for obtaining a substantial increase in production rate in a given size reactor over what was previously possible in a fluidized bed process.

A limiting factor in the rate of production of polymer in a fluidized bed is the rate at which heat can be removed. The most common and perhaps universal means of heat removal employed in conventional fluidized bed reactor processes is by compression and cooling of the recycle gas stream at a point external to the reactor. In commercial scale fluidized bed reaction systems for producing polymers such as polyethylene, the amount of fluid which must be circulated to remove the heat of polymerization is greater than the amount of fluid required for support of the fluidized bed and for adequate solids mixing in the fluidized bed. However, the fluid velocity in the reactor is limited to the extent necessary to prevent excessive entrainment of solids in the fluidizing gas as it exits the reactor. A constant bed temperature will result if the heat generated by the polymerization reaction (which is proportional to the polymer production rate) is equal to the heat absorbed by the fluidizing stream as it passes through the bed, plus any heat removed or lost by other means.

It has long been assumed that the recycle gas temperature could not be lowered any further than to a point slightly above the dew point of the recycle gas stream, the dew point being the temperature at which liquid condensate begins to form in the gas stream. This assumption was predicated on the belief that the introduction of liquid into a gas phase fluidized bed reactor would inevitably result in plugging of the recycle lines, heat exchanger or below the fluidized bed or gas distributor plate, (if one is employed); non-uniformity of monomer concentrations inside the fluidized bed; and accumulation of liquid at the bottom of the reactor which would interfere with continuous operation or result in complete reactor shut-down. It was widely believed that, in the extreme case, liquid present in the fluidized bed of a gas phase process, could so disrupt the fluidization process in the bed as to result in a collapse of the bed and sintering of the solid particles into a solid mass. The perceived need to operate above the dew point to avoid liquid in the recycle stream has substantially restricted the production rate in reactors of a given size or, in the alternative, required the use of a substantially oversized reactor in manufacturing polyolefins to achieve acceptable production rates. The problem is exacerbated in situations where a reactor has been sized for a homopolymer and it is desired to use the reactor to manufacture products, such as those using hexene as a comonomer, where the dew point of the recycle stream is relatively high. Production rates in such situations have been even more severely restricted by past practices. The care exercised in accordance with this widely held belief to avoid the presence of any liquid in the recycle stream when it enters the reaction zone (fluidized bed) is evident from the teachings of U.S Pat. Nos. 3,922,322 and 4,035,560 and European Patent Application' No. 0 050 477. U.S. Pat. No. 4,359,561 teaches that the temperature of the recycle stream at the outlet of the recycle heat exchange zone should be limited to a temperature at least about 3° to 10° C. above its dew point.

Similarly, European Patent Application No. 0,100,879 published Feb. 2, 1984 states, in the context of a gas phase polymerization process for incorporating 1-olefin comonomers into a polymer chain of ethylene units that 1-olefin comonomers "normally require a higher feed temperature to prevent their condensation."

We have discovered, contrary to these widely held beliefs, that in continuous fluidized bed polymerization processes, the recycle stream can be cooled below the dew point to partially condense a portion thereof and the resulting stream containing entrained liquid returned to the reactor without plugging or other problems which would interfere with continuous reactor operation. Such operation has been called "condensing mode" polymerization operation and is disclosed in prior U.S. application Ser. No. 361,547, filed Mar. 24, 1982 and U.S. application Ser. No. 594,962, filed Apr. 3, 1984. As there disclosed, the employment of the condensing mode permits a reduction in the recycle stream temperature to a point below the dew point which results in a marked increase in space-time-yield for the continuous polymerization process over that obtainable in the non-condensing mode of operation of the prior art.

The primary limitation on reaction rate in a fluidized bed reactor is the rate at which heat can be removed from the polymerization zone. Although they differ in very important ways from gas fluidized bed reaction systems, the same heat limitation problems exist in other types of reaction systems such as stirred, gas-phase reaction systems and, to some extent, slurry reaction systems.

In U.S. Pat. No. 3,256,263, heat removal in a stirred reaction system is achieved by the compression of recycle gases and expansion upon reentry into the reactor. In other stirred or paddle-type reaction systems some additional cooling is effected by the injection of liquid onto the top of the bed. See for example, U.S. Pat. Nos. 3,254,070, 3,300,457 and 3,652,527.

In U.S. Pat. Nos. 3,965,083, 3,970,611 and 3,971,768 assigned to Standard Oil Co. (Indiana), cooling of a stirred bed reactor is supplemented by injection of liquids on the top of the bed.

In U.S. Pat. No. 4,012,573 (Trieschmann et al) gases withdrawn from a stirred reactor are condensed to liquid and returned in liquid form to the stirred reactor where the liquid is brought into desired contact with polymer in the stirred bed.

Mitsubishi Petrochemical Co. has proposed the use of liquids or regasified liquids for cooling in a gas phase reactor (J55/045,744/80, U.S. Pat. No. 3,944,534 and DT 2 139 182). In these disclosures all of the liquid or regasified liquid is injected directly into the bed rather than entering with the fluidizing gas as in the present invention. DT 2 139 182 is specific to stirred beds rather than fluidized beds. In J55/045,744/80 the liquid is regasified before being injected into the fluidized bed.

In Japanese Patent Publication No. 4608/81, Mitsubishi Petrochemical Company has proposed the use of an inert hydrocarbon in liquid form in a process described as gaseous phase polymerization oF olefins. The hydrocarbon having three or more carbon atoms is allowed to be present in liquid form in an amount corresponding to 1–20 weight percent of the polymer granules in the vessel. The liquid hydrocarbon is described as useful for avoiding electrostatic adhesion of the polymer granules to the exterior parts of the polymerization vessel. Apparently, to achieve the desired results, the Publication contemplates that the liquid will not evaporate but rather will be present throughout the process in its liquid state. The only exemplary support in the Publication is a stirred vessel, apparently of lab scale size since a charge of 20 grams of polyethylene powder was used to initiate the process. However, according to the Publication, the vessel may be of any existing type For gaseous phase polymerizations, e.g., a fluidized bed type or an autoclave type equipped with an agitator.

In U.S. Pat. No. 3,625,932, assigned to Phillips Petroleum Co., a multiple-stage fluidized bed reactor for the polymerization of vinyl chloride is described. In the reactor liquid monomer is introduced through distribution rings below each bed of polymer particles where it vaporizes immediately, thus absorbing large amounts of heat of reaction, and, together with gaseous monomer introduced into the bottom of the reactor vessel, serves to fluidize the beds of polymer particles.

In a fluidized bed reaction system, as distinguished from stirred or paddle-type reaction systems where agitation by mechanical means is available, uniform distribution of monomer and catalysts in the upwardly moving gas stream is essential to avoid hot spots and resulting polymer chunks. In stirred and paddle-type reactors these problems are overcome by mechanical stirring and agitation which serve to (1) attain contact between the two phases, i.e., the gas phase and the solid particles phase, (2) assist in providing uniform temperature throughout the reaction vessel and (3) reduce the tendency for polymer chunks to form or "sheeting" to occur, i.e., polymer buildup on surfaces of the reactor system. These potential problems must be dealt with in a fluidized bed system without the benefit of mechanical agitation. Additionally, the velocity of gas flowing through the reactor must be adequate to maintain the bed in a fluidized state. The gas velocity required to keep the bed in a fluidized suspension cannot be achieved under normal conditions by mere injection of liquid at the bottom of the bed. Therefore, the direct liquid injection cooling of a reactor, as described by Trieschmann et al, is not a viable option for a fluidized bed reaction system.

SUMMARY OF THE INVENTION

In accordance with the present invention, a process is provided for increasing the space time yield of polymer production in a fluidized bed reactor employing an exothermic polymerization reaction by cooling the recycle stream to below its dew point and returning the resultant liquid containing recycle stream to the reactor where it is vaporized thereby maintaining the fluidized bed at the desired temperature. By operating in a condensing mode, i.e., below the dew point of the recycle stream, the cooling capacity of the recycle stream is increased by both the vaporization of the condensed liquids entrained in the recycle stream and as a result of the greater temperature differential between the entering recycle stream and the reactor. The liquid content of the recycle stream can be quite high, but as a general rule should not exceed about 20 weight percent. Below 2 weight percent the benefit obtained is not great. Since solids carried over in the gaseous stream exiting the reactor can create problems with "mud", i.e., the formation of wet agglomerated solid articles which accumulate in regions of low velocity in the recycle lines, the weight ratio of liquid to solids in the recycle stream should not be less than about 2:1.

DETAILED DESCRIPTION OF THE INVENTION

While not limited to any particular type or kind of polymerization reaction (so long as the reaction is of an exothermic nature), this invention is particularly suited to polymerization reactions involving the polymerization of one or more of the monomers listed below:

I. Olefin type: ethylene, propylene, butene-1, pentene-1, 4-methylpentene-1, hexene-1, styrene.

II. Polar vinyl monomer type: vinyl chloride, vinyl acetate, vinyl acrylate, methyl methacrylate, tetrafluoroethylene, vinyl ether, acrylonitrile.

III. Diene type (conjugated and non-conjugated): butadiene, 1,4-hexadiene, isoprene, ethylidene norbornene.

IV. Acetylene type: acetylene, substituted acetylene, such as methyl acetylene.

V. Aldehyde type: Formaldehyde.

It is to be noted that catalysts employable in the fluidized bed polymerization of the above monomer types would, respectively, most usually be as follows:

I. Coordinated anionic catalyst.

II. Cationic catalyst for copolymers with ethylene only; others of this type require a free-radical catalyst.

III. Either a free-radical catalyst or a coordinated anionic catalyst.

IV. A coordinated anionic catalyst.

V. An anionic catalyst.

As used herein, the term "catalyst" includes partially and totally activated precursor compositions as well as catalyst modified by prepolymerization or encapsulation.

Although this invention is not limited to any specific type of polymerization reaction, the following discussion of the operation of the process is primarily directed to polymerizations of olefin-type monomers where the invention has been found to be especially advantageous.

In very general terms, a conventional fluidized bed process for producing resins, particularly polymers produced from monomers, is practiced by passing a gaseous stream containing one or more monomers continuously through a fluidized bed reactor under reactive conditions and in the presence of catalyst at a velocity sufficient to maintain the bed of solids particles in a suspended condition. The gaseous stream containing unreacted gaseous monomer is withdrawn from the reactor continuously, compressed, cooled and recycled into the reactor. Product is withdrawn from the reactor and make-up monomer is added to the recycle stream. In the course of sweeping the gaseous stream through the fluidized bed reactor to maintain the bed in a suspended condition, a minor portion of the solids particles present in the bed may be carried out of the reactor with the gaseous stream which is recycled to the reactor. Since these particles are hot and contain catalyst, they will continue to grow by further reaction with monomer gas as they are carried through the recycle system, potentially causing problems by settling out and agglomerating into a solid mass or sticking to the walls of the recycle line and heat exchanger. This may ultimately lead to plugging of the gas distributor plate, recycle lines or heat exchanger, necessitating shutdown. Accordingly, it is important to minimize the carryover of particles in the recycle stream.

While virtually all solid particle carryover can be eliminated, the penalty to accomplish complete removal is in substantially increased capital cost for auxiliary equipment, e.g., cyclones, and the increased cost for the maintenance and operation of this auxiliary equipment. Since a minor amount of solid particle carryoverin the recycle stream is manageable, it is preferred to accept a minimal amount of solid particle carryover rather than to eliminate it completely. However, when operating in a condensing mode in accordance with this invention, care should be taken to prevent the formation of "mud", which can occur if the proper ratio of liquids to solid particle carryover is not maintained.

The polymer-forming reaction is exothermic, making it necessary to maintain in some fashion the temperature of the gas stream inside the reactor at a temperature not only below the resin and catalyst degradation temperatures, but at a temperature below the fusion or sticking temperature of resin particles produced during the polymerization reaction. This is necessary to prevent plugging oF the reactor resulting from rapid growth of polymer chunks which are too large to be removed in a continuous fashion as product. It will be understood, therefore, that the amount of polymer that can be produced in a fluidized bed reactor of a given size in a specified time period is directly related to the amount of heat which can be withdrawn from the fluidized bed.

In accordance with this invention the recycle gas stream is intentionally cooled to a temperature below the dew point of the recycle gas stream to form a mixture comprising a liquid phase and a gas phase, and which may also contain a minor amount of carried over solid polymer particles. A substantial increase in space time yield results from the practice of this invention and, surprisingly, with little or no change in product properties or quality. When practiced as described herein, the overall process proceeds continuously and smoothly and without unusual operational difficulties.

It may be desirable in some instances to raise the dew point of the recycle gas stream to permit a larger increase in heat removal. The recycle stream dew point can be increased by: (1) raising the operating pressure of the reaction system, (2) increasing the concentration of condensible fluids in the recycle stream, and/or (3) reducing the concentration of noncondensible gases in the recycle stream. In one embodiment of this invention, the dew point of the recycle stream is increased by the addition of a condensible fluid to the recycle stream which is inert to the catalyst, reactants, and the products of the polymerization reaction. The condensible fluid can be introduced into the recycle stream with makeup monomer(s) or by any other means or at any other point in the system. Examples of such condensible fluids are saturated hydrocarbons, such as butanes, pentanes or hexanes.

A primary limitation on the extent to which the recycle gas stream can be cooled below the dew point is the requirement that the amount of gas in the stream and the velocity of the stream be maintained at levels sufficiently high to keep the liquid phase of the mixture (and any solids particles present) in an entrained or suspended condition until the stream enters the fluidized bed where the liquid is vaporized. Of course, the velocity of the recycle stream must also be high enough to support the fluidized bed within the reactor.

Another limitation on the extent to which the recycle stream can be cooled below the dew point is the requirement that the liquid which enters the fluidized bed must vaporize rapidly and not accumulate as a layer of liquid on the top of the gas distributor plate. The presence of a layer of liquid will disrupt gas fluidization in the lower part of the bed and this may result in channeling of the gas in the lower part of the bed. This would likely result in the formation of large chunks of agglomerated resin at the gas distributor plate which could necessitate reactor shutdown. Thus the amout of liquid which can be permitted in the recycle stream is limited to that quantitity which will vaporize quickly in the lower regions of the reaction zone without the formation of a separate liquid layer on the distributor plate. Numerous factors, known to those skilled in the art, will affect the process of vaporization and, thus, the quantity of liquid which can be permitted. It has been demonstrated that for ethylene polymerization, as much as 20 weight percent of the recycle stream may be condensed without encountering disruption of the fluidization process or formation of a layer of liquid on the gas distributor plate.

The liquid content of the recycle stream can be quite high, but as a general rule, the quantity of condensed liquid contained in the gas phase should not exceed about 20 weight percent (based on the total weight of the recycle stream). When the liquid content is below 2 weight percent the benefit obtained is small. Usually, with polyolefins the amount of liquid present in the recycle stream is in the range of from 2 to 12 weight percent (based on the total weight of the recycle stream).

The portion of the gaseous stream flowing through the fluidized bed which does not react in the bed leaves the reaction zone and passes into a velocity reduction zone above the bed. The gaseous stream entering the velocity reduction zone carries with it large quantities of entrained solid particles. As the velocity of the gaseous stream is reduced, the larger of the entrained particles drop back into the bed thereby reducing solid particle carryover out of the reactor. The particles which are carried out of reactor are the smaller particles or "fines". These are the particles which have a terminal falling velocity which is lower than the velocity of the recycle gas in the velocity reduction zone, i.e., typically smaller than about 150 to 200 microns in diameter.

To the extent that solid particles are carried over in the gaseous stream exiting the reactor, it is important that the amount of liquid present in the recycle stream be sufficient to avoid forming "mud". Undesirable "mud" may result from wetting of solid particles, agglomeration and disentrainment resulting in accumulation and deposition in regions of relatively low velocity in the system, e.g., in the gas distributor plate, mixing chamber, heat exchanger or elsewhere in the recycle lines. The amount of solids in the gaseous stream exiting the reactor is typically small, e.g., from about 0.1 to about 0.5 weight percent (based on the total weight of the stream). However, larger amounts, on the order of one weight percent or higher, may occur. Since the ratio of liquid to solid particles at which mud can form is somewhat variable (based, it is believed, at least in large part on particle shape and size), the weight ratio of liquid to solid particles in the recycle stream is ordinarily maintained at not less than about two to one, preferably not less than about five to one, and, more preferably not less than ten to one to avoid this potential problem. The latter higher ratios provide protection against aberrations in operation which may result in transitory higher solids carryover in the gaseous stream exiting the reactor and protection against changes in production rates which could reduce the liquid fraction.

An excess of liquid serves to prevent the accumulation of solids in the system at any point in the system where they might otherwise settle out and to keep the system washed clean. In no event should the ratio fall below about two to one when the amount of liquid in the entering recycle stream is in the desired operating range of from about 2 to about 20 weight percent. When operating in a noncondensing mode, i.e., substantially dry or without a significant amount of liquid in the recycle, the ratio of liquid to solids particles in the recycle stream is not significant since the solids will not be wetted to any significant extent and the formation of mud is not a problem.

The entry point for the recycle stream should be below the fluidized bed (polymerization zone) to provide a uniform flow of gas to maintain the bed in a suspended condition. The recycle stream containing entrained liquid is introduced into the reactor at a point in the lower region of the reactor and most preferably at the very bottom of the reactor to ensure adequate uniformity of the fluid stream passing upwardly through the fluidized bed.

If desired, the recycle stream can be divided into two or more separate streams one or more of which can be introduced directly into the polymerization zone provided that sufficient gas velocity below and through the bed is provided to keep the bed suspended. In all cases the composition of the gas stream is kept generally uniform and distributed in a manner such that the product specifications are achieved and there are no dead spaces in the bed where solid polymer chunks form which cannot be removed by normal product removal means.

It will be apparent that, if desired, it is possible to form a stream comprising both a liquid phase and a gaseous phase within the reactor below the gas distributor plate by separately injecting recycle gas and a liquid under conditions which will produce a stream comprising both phases. It may be desirable to inject liquid make-up monomer in this fashion.

It should be recognized that the benefits of the subject invention can be achieved by introducing vaporizable liquid into the reactor system other than entirely via the recycle stream. For example, liquid, particularly liquid monomer, can be supplementally injected directly into the reaction zone or fluidized bed, preferably in the lower portion of the fluidized bed in the region where a temperature gradient exists. The manner and position(s) of introduction of the liquid must be such that the liquid will fully vaporize within the fluidized bed so that liquid is not carried out of the reaction zone. The amount of liquid introduced via the recycle stream should generally not exceed the amount specified above, i.e., about 20 weight percent maximum based on the total weight of the recycle stream and the liquid separately injected. If substantial amounts of vaporizable liquid are supplementally introduced along the length of the fluidized bed the total amount of liquid introduced may exceed 20 percent.

It should also be recognized that the introduction of a liquid into the reactor system as contemplated by this invention is distinguished from the injection of liquid monomers, e.g., such as hexene, in minor amounts for the purpose of polymer property modification in a noncondensing mode of operation where the recycle stream temperature is above its dew point. This type of injection, typically by injection of the liquid monomer into the recycle stream prior to entry into the mixing chamber of the reactor may result in the introduction of small amounts of liquid into the fluidized bed by virtue of the limited time span between introduction of the liquid monomer and the time it is carried into the bed by the recycle stream. Because of the short time span this liquid monomer may not have time to reach thermal equilibrium prior to entering the bed. However, because of the large amount of gas present in the recycle stream vis-a-vis the amount of injected, liquid monomer, the monomer would vaporize in the gaseous recycle stream if sufficient time were available for thermal equilibrium to be reached. In the process of this invention, the temperature of the recycle stream is such that liquid introduced into the reactor either via the recycle stream will not vaporize—even if thermal equilibrium is reached-until it reaches a region of higher temperature such as the layer or region having a temperature gradient in the lower portion of the fluidized bed.

The advantages of this invention are not limited to the production of polyolefin resins. This invention can be practiced in connection with any exothermic polymerization process carried out in a gas phase fluidized bed. The advantages of this invention over conventional processes will generally increase in direct relation to the nearness of the dew point temperature of the recycle stream to the reaction temperature within the interior of the fluid bed.

The applicability of this invention to the roduction of any given polymer can be determined by the use of the following formula:

$$X = \frac{P \cdot H_{rxn}}{G_{mass} \cdot CP_{gas}(T_{rxn} - T_{limit})}$$

Where:
P = desired polymer production rate; constrained to rates giving X less than 1.0 without subject invention.

$H_{rxn}$ = heat of polymerization of specific polymer being produced.

$G_{mass}$ = mass flow rate of recycle stream; limited to a minimum value by the need for adequate fluidization and mixing in the bed and to a maximum value by entrainment of solids. Specific minima and maxima depend on numerous factors known to those skilled in the art.

$CP_{gas}$ = heat capacity of the recycle stream.

$T_{rxn}$ = temperature of the reaction zone (fluid bed); has maximum value depending on the sticking temperature of the polymer at the pressure of the recycle stream and/or the catalyst performance, and a minimum value which is dependent on catalyst performance.

$T_{limit}$ = minimum temperature of the recycle stream entering the reaction zone as limited prior to the present invention. This temperature is either the dew point of the recycle stream or the cooling limit of the heat exchange zone, whichever is higher. If $T_{limit}$ is the recycle stream dew point, the invention is practiced by simply cooling the stream to a temperature below its dew point. If $T_{limit}$ is controlled by the heat exchange zone, the invention is practiced by adding a condensible fluid to increase the dew point of the recycle stream to a temperature above the cooling limit of the heat exchange zone.

Whenever the value of X is greater than 1, the use of this invention will afford a benefit and as the value of X increases, the greater will be the benefits which can result from this invention.

In addition, the benefit to be derived from practicing this invention increases as the size of the reactor is increased and more particularly as the bed depth is increased. The velocity of the gas circulated through the bed is constrained on the lower end by the requirement that the velocity be sufficient to maintain the bed in a fluidized condition and on the upper end by the requirement that the velocity not be so high as to carry large amounts of the solids material from the bed over in the recycle stream exiting the top of the reactor. For a given gas velocity and space-time-yield, therefore, the amount of heat to be removed from the fluidized bed is directly proportional to the bed depth. Because the quantity of gas circulated does not change as bed depth is increased, the temperature of the gas entering the reactor must be reduced in direct proportion to the bed depth. As bed depth is increased, therefore, the likelihood increases that the reactor inlet temperature will approach the dew point of the gaseous stream and this invention may be advantageously employed. It will furthermore be apparent that for a relatively shallow pilot plant apparatus, e.g., having a fluid bed depth of no more than about five Feet, the temperature of the inlet gas stream may be only a few degrees, e.g., on the order of 3 or 4 degrees Centigrade, below the temperature of the fluidized bed. Because of this small temperature difference, it would be very difficult to operate a pilot plant reactor in the condensing mode; and, at most, only a small fraction of the recycle stream could be condensed.

A fluidized bed reaction system which is particularly suited to production of polyolefin resin by the practice of the process of the present invention is illustrated in the drawings. With reference thereto and particularly to FIG. 1, the reactor 10 comprises a reaction zone 12 and a velocity reduction zone 14.

Figure 1:
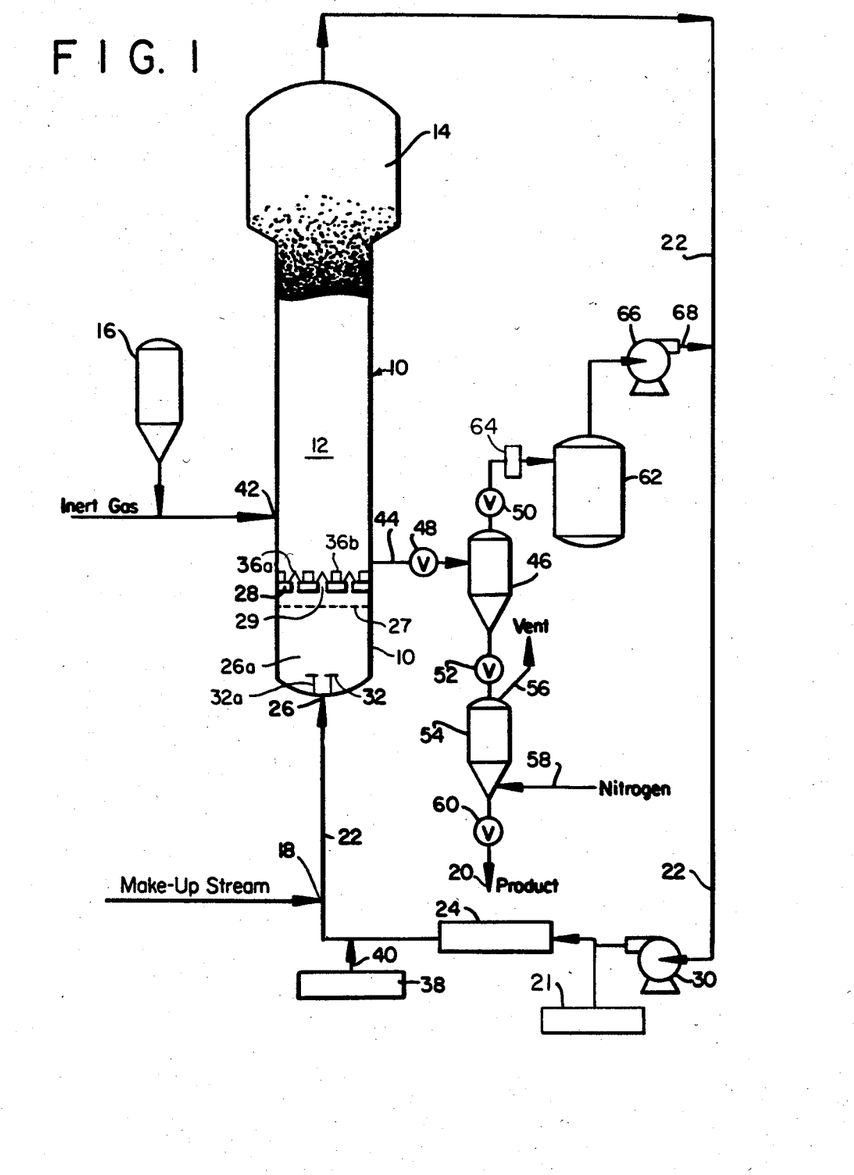
FIG. 1 is a schematic illustration of a preferred system used in the practice of continuous, gaseous phase, fluidized bed polymerization of olefins.

In general, the height to diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.5 ft/sec. Preferably the SGV is at least 0.2 ft/sec above the minimum flow for fluidization or from about 0.4 to about 0.7 ft/sec. Ordinarily, the SGV will not exceed 5.0 ft/sec and it is usually no more than 2.5 ft/sec.

Particles in the bed help to prevent the formation of localized "hot spots" and to entrap and distribute the particulate catalyst throughout the reaction zone. Accordingly, on start up, the reactor is charged with a base of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed.

The catalysts used are often sensitive to oxygen, thus the catalyst used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 50 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid is fed at point 18 via recycle line 22. The composition of the recycle stream is measured by a gas analyzer 21 and the composition and amount of the make-up stream is then adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. The gas analyzer 21 can be positioned to receive gas from a point between the velocity reduction zone 14 and the heat exchanger 24, preferably, between the compressor 30 and the heat exchanger 24.

To ensure complete fluidization, the recycle stream and, where desired, part of the make-up stream are returned through recycle line 22 to the reactor at point 26 below the bed. preferably there is a gas distributor plate 28 above the point of return to aid in fluidizing the bed uniformly and to support the solid particles prior to startup or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream is then compressed in a compressor 30 and then passed through a heat exchange zone where the heat of reaction is removed from the recycle stream before it is returned to the bed. The heat exchange zone may be a conventional heat exchanger 24 which can be of the horizontal or vertical type. The recycle stream exiting the heat exchange zone is then returned to the reactor at its base 26 and thence to the fluidized bed through a gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained. The preferred type of fluid flow deflector plate 32 has an annular disc shape such as that described in FIGS. 2, 2A and 3 of this application and as is described in detail in the copending and contemporaneously filed U.S. patent application of S. J. Rhee et al Ser. No. 643,882, filed Aug. 24, 1984, abandoned and refiled as Ser. No. 780,273 on Sept. 26, 1985, entitled "Improvements In Fluidized Bed Polymerization Reactors".

Figures 2, 2A:
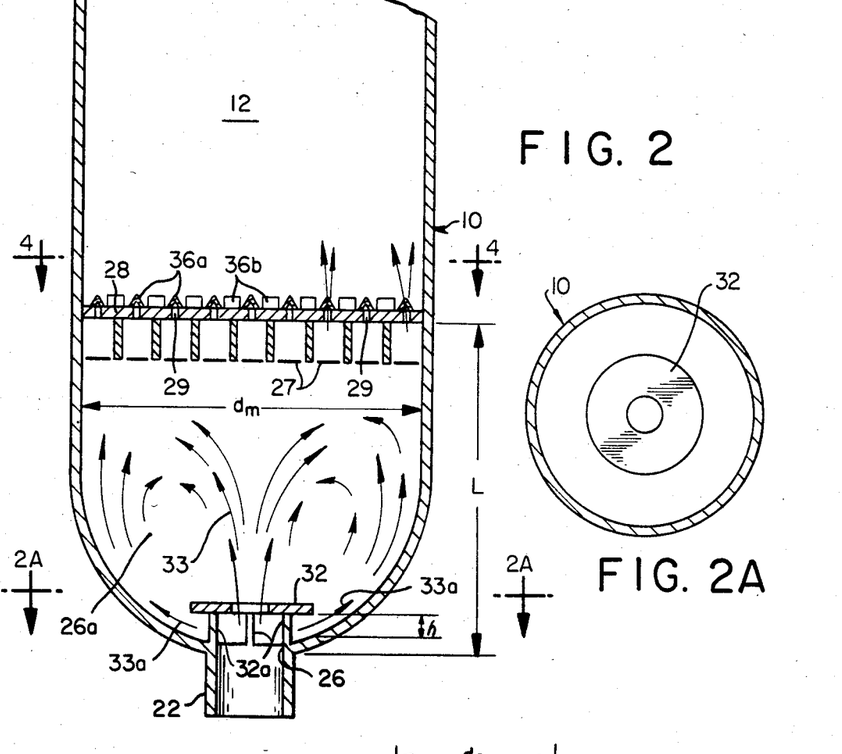
FIG. 2 is an elevational view in cross-section of the lower portion of a reaction vessel useful in the fluidized bed reaction system of this invention showing the preferred flow deflector means (an annular disc inlet flow deflector) and the gas distributor plate.
FIG. 2A is a top view of the flow deflector means as viewed along line 2A—2A of FIG. 2.
Figure 3:
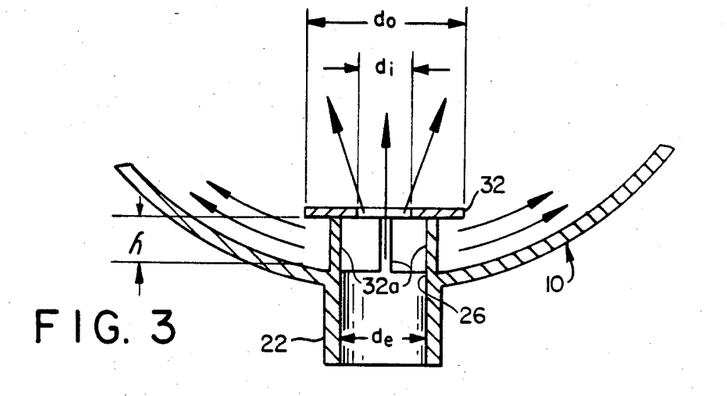
FIG. 3 is a partial elevational view in cross-section of the entry means and flow deflector means of FIG. 2.

Referring to FIGS. 2, 2A and 3, the recycle stream is returned to the reactor at its base 26 and to the fluidized bed through diffuser mixing chamber 26a and gas distributor plate 28. The preferred annular disc inlet flow deflector, as shown in FIGS. 2, 2A and 3 of the drawings, comprises an annular disc 32 supported at a standoff distance above the reactor inlet 26 by the spacers 32a and divides the entering recycle stream into a central upward flow stream 33 and an upward peripheral annular flow stream 33a along the lower side walls of the reactor. The flow streams mix and then pass through protective screen 27, the holes or ports 29 of the distributor plate 28 and the angle caps 36a and 36b, secured to the upper surface of the distributor plate, and eventually into the fluidized bed.

The central upward flow stream 33 in the mixing chamber 26a assists in the entrainment of liquid droplets in the bottom head or mixing chamber and in carrying the entrained liquid to the fluidized bed section during a condensing mode of reactor operation. The peripheral flow 33a assists in minimizing build-up of solid particles in the bottom head because it sweeps the inner surfaces of the reactor walls. The peripheral flow also contributes to the re-atomization and re-entrainment of any liquid which may be disentrained at the walls or accumulate at the bottom of the diffuser mixing chamber, particularly with a high level of liquid in the recycle stream. The annular deflector means 32, which provides both central upward and outer peripheral flow in the mixing chamber, permits a reactor to be operated without the problems of liquid flooding or excessive build-up of solids at the bottom of the reactor.

Agglomeration of polymer on the reactor wall can be alleviated, where necessary, by treatment of the reactor with any of a variety of antifouling substances. Among the many substances available as coatings or additives for this purpose are various halides, hydroxides, oxides and carboxylates of metals such as tin, chromium and the alkali metals. Also useful are a variety of organic substances such as tannic acid, tannins, polyaromatic amines, polyethyleneimine, self-condensed polyhydric phenols, and various organic dyes as well as organo metallic substances such as chromocene and various metal complexes of dyes such as nigrosine and aniline black to name but a few. Further and more detailed information on various techniques employed to retard or inhibit reactor fouling can be found in U.S. Pat. Nos. 3,669,946; 3,919,185; 4,081,248; 4,105,838: 4,105,839; 4,105,840; 4,105,841; 4,256,854: 4,267,291 and 4,374,966. There is ample indication that condensing mode operation in accordance with this invention alleviates reactor fouling, if it should occur.

The temperature of the bed is basically dependent on three factors: (1) the rate of catalyst injection which controls the rate of polymerization and the attendant rate of heat generation, (2) the temperature of the gas recycle stream and (3) the volume of the recycle stream passing through the fluidized bed. Of course, the amount of liquid introduced into the bed either with the recycle stream and/or by separate introduction also affects the temperature since this liquid vaporizes in the bed and serves to reduce the temperature. Normally the rate of catalyst injection is used to control the rate of polymer production. The temperature of the bed is controlled at an essentially constant temperature under steady state conditions by constantly removing the heat of reaction. By "steady state" is meant a state of operation where there is no change in the system with time. Thus, the amount of heat generated in the process is balanced by the amount of heat being removed and the total quantity of material entering the system is balanced by the amount of material being removed. As a result, the temperature, pressure, and composition at any given point in the system is not changing with time. No noticeable temperature gradient appears to exist within the upper portion of the bed. A temperature gradient will exist in the bottom oF the bed in a layer or region extending above the distributor plate, e.g., for about 6 to about 12 inches, as a result of the difference between the temperature of the inlet fluid and temperature oF the remainder of the bed. However, in the upper portion or region above this bottom layer, the temperature of the bed is essentially constant at the maximum desired temperature.

Good gas distribution plays an important role in the efficient operation of the reactor. The fluidized bed contains growing and formed particulate polymer particles, as well as catalyst particles. As the polymer particles are hot and possibly active, they must be prevented from settling, for if a quiescent mass is allowed to exist, any active catalyst present will continue to react and can cause fusion of the polymer particles resulting, in an extreme case, in the formation of a solid mass in the reactor which can only be removed with great difficulty and at the expense of an extended downtime. Since the fluidized bed in a typical commercial size reactor may contain many thousand pounds of solids at any given time, the removal of a solid mass of this size would require a substantial effort. Diffusing recycle fluid through the bed at a rate sufficient to maintain fluidization throughout the bed is, therefore, essential.

Similarly, it is essential that liquid introduced into the fluidized bed either via the recycle stream or directly be vaporized to achieve the benefits of this invention. Further, there is a danger that the bed will collapse with all the attendant problems, including the likelihood that a solid fused mass will form, if high liquid levels are present in the bed, e.g., 10 to 20 weight percent of the solid particles in the fluidized bed. Additionally, an essentially constant temperature in the fluidized bed is necessary to produce polymer product having consistent properties. For these reasons, the amount of liquid introduced into the fluidized bed is preferably no greater than the amount that will vaporize in the lower region of the fluidized bed under a given set of process conditions.

The gas distributor plate 28 is a preferred means for achieving good gas distribution and may be a screen, slotted plate, perforated plate, a plate of the bubble-cap type or the like. The elements of the plate may all be stationary, or the plate may be of the mobile type disclosed in U.S. Pat. No. 3,298,792. Whatever its design, it must diffuse the recycle fluid through the particles at the base of the bed to keep the bed in a fluidized condition, and also serve to support a quiescent bed of resin particles when the reactor is not in operation.

The preferred type gas distributor plate 28 is generally of the type which is fabricated from metal and which has holes distributed across its surface. The holes or ports are normally of a diameter of about one half inch. The holes extend through the plate, and over the holes there are positioned angle iron sections identified by reference numerals 36a and 36b in FIG. 1 which are fixedly mounted to plate 28. Alternate rows of angle irons are oriented at angles to each other, preferably at 60 degrees, with each set of alternate angle irons in a given row preferably parallel to each other. Orientation is shown in more detail and described in the contemporaneously filed U.S patent applicatin of S. J. Rhee et al Ser. No. 643,882, filed Aug. 24, 1984, abandoned and refiled as Ser. No. 780,273 on Sept. 26, 1985, entitled "Improvements In Fluidized Bed Polymerization Reactors". They serve to distribute the flow of fluid along the surface of the plate so as to avoid stagnant zones of solids. In addition they prevent resin particles from falling through the holes when the bed is settled or quiescent.

Any fluid inert to the catalyst and reactants and which, if a liquid, will volatilize under the conditions present in the fluidized bed, can also be present in the recycle stream. Other materials, such as catalyst activator compounds, if utilized, are preferably added to the reaction system downstream from heat exchanger 24. Thus, the materials may be fed into the recycle system from dispenser 38 through line 40 as shown in FIG. 1.

It is essential to operate the fluid-bed reactor at a temperature below the sintering temperature of the polymer particles to ensure that sintering will not occur. The sintering temperature is a function of resin density. For example, polyethylene low density resins have a low sintering temperature while polyethylene high-density resins have a higher sintering temperature. Accordingly, temperatures of from about 75° C. to about 95° C. may be used to prepare ethylene copolymers having a density of from about 0.91 g/cm$^3$ to about 0.95 g/cm$^3$, while temperatures of from about 90° C. to about 115° C. may be used to prepare ethylene copolymers or homopolymers having a density of from about 0.95 g/cm$^3$ to about 0.97 g/cm$^3$.

The fluid-bed reactor may be operated at pressures of up to about 1000 psig. For polyolefin resin production, the reactor is preferably operated at a pressure of from about 250 to about 500 psig, with operation at the higher pressures in such ranges favoring heat transfer since an increase in pressure increases the unit volume heat capacity of the gas.

The catalyst is injected intermittently or continuously into the bed at a desired rate at a point 42 which is above the distributor plate 28. Preferably, the catalyst is injected at a point in the bed where good mixing with polymer particles occurs. Injecting the catalyst at a point above the distributor plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots". Injection of the catalyst into the reactor is preferably carried out in the lower portion of the fluidized bed to provide uniform distribution and to minimize catalyst carryover into the recycle line where polymerization may begin and plugging of the recycle line and heat exchanger may eventually occur.

The catalyst can be injected into the reactor by various techniques. For ethylene polymerization it is preferred to continuously feed the catalyst into the reactor utilizing a catalyst feeder as disclosed; e.g., in U.S. Pat. No. 3,779,712. The catalyst is preferably fed into the reactor at a point 20 to 40 percent of the reactor diameter away from the reactor wall and at a height above the bottom of the bed equal to from about 5 to about 30 percent of the height of the bed.

A gas which is inert to the catalyst, such as nitrogen or argon, is preferably used to carry the catalyst into the bed.

The rate of polymer production in the bed depends on the rate of catalyst injection and the concentration of monomer(s) in the recycle stream. The production rate is conveniently controlled by simply adjusting the rate of catalyst injection.

Under a given set of operating conditions, the fluidized bed is maintained at essentially a constant height by withdrawing a portion of the bed as product at the rate of formation of the particulate polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst injection.

On discharge of particulate polymer product from the reactor 10, it is desirable, and preferable, to separate fluid from the product and to return the fluid to the recycle line 22. There are numerous ways known to the art to accomplish this. One system is shown in the drawings. Thus, fluid and product leave the reactor 10 at point 44 and enter the product discharge tank 46 through a valve 48 which is designed to have minimum restriction to flow when opened, e.g., a ball valve. Positioned above and below product discharge tank 46 are conventional valves 50, 52 with the latter being adapted to provide passage of product into the product surge tank 54. The product surge tank 54 has venting means illustrated by line 56 and gas entry means illustrated by line 58. Also positioned at the base of product surge tank 54 is a discharge valve 60 which, when in the open position, discharges product for conveying to storage. Valve 50, when in the open position, releases fluid to surge tank 62. Fluid from product discharge tank 46 is directed through a filter 64 and thence through surge tank 62, a compressor 66 and into recycle line 22 through line 68.

In a typical mode of operation, valve 48 is open and valves 50, 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and product in the product discharge tank 46 flows into the product surge tank 54. Valve 52 is then closed. The product is purged with inert gas, preferably nitrogen, which enters the product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. The valves can be kept substantially free of agglomerated particles by installation of means for directing a stream of gas periodically through the valves and back to the reactor.

Another more preferred product discharge system which may be employed in the alternative is that disclosed and claimed in the copending U.S. patent application Ser. No. 287,815, of Robert G. Aronson, filed July 28, 1981, now abandoned, and entitled "Fluidized Bed Discharge Process" (published as EPA Application No. 0071430 on Feb. 9, 1983). Such a system employs at least one pair of tanks (and more preferably two pairs of tanks in parallel) comprising a settling tank and a transfer tank arranged in series and having the separated gas phase returned from the top of the settling tank to a point in the reactor near the top of the fluidized bed. This alternative preferred product discharge system obviates the need for a recompression line 64, 66, 68, as shown in the system of the drawing.

In the basic embodiment of the system for conducting the process of the invention, the reaction vessel contains a bed of fluidized solid particles with a gas stream entering an inlet line at the bottom and leaving through a vent line at the top. A vented settling tank, located externally and preferably below the fluidized bed, is connected to the bed by a discharge line and a vent line. The vent line is directly connected to the reaction vessel near the top level of fluidized solids bed and the solids discharge line is connected to the lower part of the vessel, preferably near the distributor plate. A transfer tank is located below and is connected to the bottom of the settling tank by a line and is connected to downstream processing equipment through a discharge line. Initially, the reaction vessel and settling and transfer tanks are isolated from each other and from downstream equipment by valves. Solids and gas are discharged from the reaction vessel into the settling tank by opening discharge and vent line valves while keeping the settling tank outlet valve closed. The settling tank pressure initially increases to approximately that in the bottom of the reaction vessel and then the differential pressure across the fluidized bed of solids is the driving force for solids and gas to flow through the discharge line. A portion of this fluidizing gas and solids flows through discharge line to the settling tank because of the lower resistance flow path compared to the flow path through the fluidized bed of solids. The solids and gas separate in the settling tank and the gas is returned to the reaction vessel through the vent line by displacement with additional solids and gas entering the settling tank. After the settling tank fills with settled solids and some gas, the settling tank is isolated from the reaction vessel by closing the discharge and vent line valves. The solids are then transferred by pressure differential and by gravity, from the settling tank to the transfer tank through a line by opening the valve therein. With the solids in the transfer tank and the tank pressures equalized, the line valve is closed. The settling tank is now ready to start another discharge cycle or it can wait until the transfer tank is finished transferring the solids to downstream equipment. Solids are then transported from the transfer tank to downstream equipment at lower pressure by opening the outlet valve. Solids transfer can be by conventional solids handling equipment or by high pressure conveying using the pressurized gas that is entrained with the solids (additional gas may be required). After the solids are transported from the transfer tank, the outlet valve is closed and the transfer tank is ready for another cycle.

In an alternate and preferred embodiment, solids are intermittently discharged from a high pressure vessel containing a fluidized bed of solids using a process that employs two pairs of the basic settling and transfer tanks operated in parallel and operating sequentially with gas vented from the solids prior to discharging the solids to a lower pressure. A first vented settling tank serves to receive solids and gas discharged from the fluidized bed. After the tank fills with solids, some of the gas entrained with the solids is vented to a second settling tank (in the parallel pair system) which serves as a temporary gas receiver, later indirectly venting to the reaction vessel. The solids are then transferred from the settling tank to a lower pressure transfer tank while minimizing gas losses. The discharge operation is continued alternating between parallel settling tanks in receiving a solids and gas stream from the fluidized bed.

The fluidized-bed reactor is equipped with an adequate venting system (not shown) to allow venting the bed during startup and shutdown. The reactor does not require the use of stirring and/or wall scraping. The recycle line 22 and the elements therein (compressor 30, heat exchanger 24) should be smooth surfaced and devoid of unnecessary obstructions so as not to impede the flow of recycle fluid or entrained particles.

Among the polymers which may be produced in the process of the present invention are homopolymers of ethylene, propylene, butene or copolymers of a major mole percent of ethylene, propylene or butene and a minor mole percent of one or more C2 to C8 alphaolefins. The C2 to C8 alphaolefins preferably should not contain any branching on any of their carbon atoms which is closer than the fourth carbon atom. The preferred C2 to C8 alphaolefins are ethylene, propylene, butene-1, pentene-1, hexene-1, 4-methylpentene-1 and octene-1.

The melt flow ratio value is a means of indicating the molecular weight distribution of a polymer. The ethylene polymers, for example, have a melt flow ratio of over about 22. A melt flow ratio (MFR) of 22 corresponds to a $M_w/M_n$ value (as determined by conventional size exclusion chromatography) of about 2.7.

The ethylene homopolymers have a density of from about 0.958 to about 0.972 gm/cc.

The ethylene copolymers have a density of less than about 0.96 gm/cc. The density of the ethylene copolymer, at a given melt index level for the copolymer, is primarily regulated by the amount of the $C_3$ to $C_8$ comonomer which is copolymerized with the ethylene. In the absence of the comonomer, the ethylene would homopolymerize to provide polymers having a density of about 0.96 or greater. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions. Thus, to produce binary copolymers of ethylene with the same density and melt index, larger molar amounts of the different comonomers would be needed in the order of $C_3 > C_4 > C_5 > C_6 > C_7 > C_8$ When made in the fluid-bed process described herein, ethylene polymers are granular materials which have a settled bulk density of about 15 to 32 pounds per cubic foot and an average particle size of the order of about 0.02 to about 0.06 inches. Particle size is important because it affects the fluidizing characteristics of the polymer particles in the fluid-bed reactor, as herein described.

In accordance with the present invention, a process is provided for increasing the space time yield of polymer production in a fluidized bed reactor employing an exothermic polymerization reaction by cooling the recycle stream to below its dew point and returning the resultant liquid-containing recycle stream to the reactor to maintain the fluidized bed at a desired temperature. It should be noted that by operating in a condensing mode, i.e., below the dew point of the recycle stream, the cooling capacity of the recycle stream is increased by both the vaporization of the condensed liquids entrained in the recycle stream and as a result of the reduced temperature of the large volume of gas passing through the fluidized bed.

The amount of condensation, and an attendant increase in production rate, can be enhanced further by altering the process conditions to increase the dew point of the recycle stream. This degree of condensation is achieved by maintaining the outlet temperature from the heat exchange zone so as to effect the required degree of cooling below the dew point of the mixture.

In practicing condensing mode operation in accordance with the invention reactor startup is initiated in the non-condensing mode and changed over to condensing moder operation beginning at the point where sufficient heat is being generated in the reaction zone to permit operation in the condensing mode while maintaining the temperature within the reaction zone at the desired level. During shutdown from condensing mode operation the temperature of the recycle gas stream is raised above the dew point prior to shutdown. In both instances it is important to rapidly pass through the stage where the recycle gas stream contains less than two percent by weight liquid to minimize the possibility of mud formation.

The invention will be better understood by reference to the following examples which are offered by way of illustration.

EXAMPLE 1

In an example of the process of the invention, a fluidized bed gas phase reaction system, as described above, was operated with a partially condensed recycle stream to produce an hexene-1/propylene/ethylene copolymer, under the following conditions:

Recycle Stream Composition (mole percent):
  Nitrogen 34.7
  Ethylene 38.1
  Ethane 8.9
  Propylene 5.1
  Hexene-1 4.8
  Hydrogen 7.3
  Methane 0.1
Recycle Stream Dew Point: 57.8° Centigrade (at the pressure of the heat exchanger).
Reactor Gas Inlet Temperature: 48° C.
Liquid in Recycle Stream: 4.6 wt. percent.
Catalyst: a complex of tetrahydrofuran, magnesium chloride and titanium chloride reduced with diethyl aluminum chloride (diethyl aluminum chloride-to-tetrahydrofuran molar ratio of 0.4) and tri-n-hexyl aluminum (tri-n-hexyl aluminum-to-tetrahydrofuran molar ratio of 0.4) impregnated on triethyl aluminum treated silicon dioxide
Reactor Temperature: 88° Centigrade.
Reactor Pressure: 270 psig.
Superficial Gas Velocity in the Fluidized Bed: 2.0 ft/sec.
Bed Height: 37 feet.
Bed Diameter: 8 feet.
Space-Time-Yield: 5.1 lb/ft$^3$hr.
Melt Index of Resin: 1.0 dg/min.
Density of Resin: 0.918 gm/cc.
Activator: triethyl aluminum.

EXAMPLE 1a

The following example was carried out under essentially identical operating conditions and using the same catalyst as in Example 1, differing only with respect to the cooling of the recycle stream and the rate of catalyst injection.

Recycle Stream Composition (mole percent):
  Nitrogen 36.5
  Ethylene 38.2
  Ethane 11.2
  Propylene 5.0
  Hexene-1 4.1
  Hydrogen 4.8
  Methane None detected
Recycle Stream Dew Point: 53.2° Centigrade (at the pressure of the heat exchanger).
Reactor Gas Inlet Temperature: 60.6° C.
Liquid in Recycle Stream: Zero.
Reactor Temperature: 87.1° C.
Reactor Pressure: 270 psig.
Superficial Gas Velocity in the Fluidized Bed: 2.0 ft/sec.
Bed Height: 37 feet.
Bed Diameter: 8 feet.
Space-Time-Yield: 2.0 lb/ft$^3$hr.
Melt Index of Resin: 1.0 dg/min.
Density of Resin: 0.918 gm/cc.
Activator: triethyl aluminum.

It is to be noted that operation below the dew point of the recycle stream, as in Example 1, resulted in an increase in space time yield (pounds of resin produced per cubic foot of bed per hour) which was approximately 2.5 times those obtained without the employment of the liquid phase in the recycle stream, as in this Example 1a.

EXAMPLES 2-7

The six following examples in tabular form set forth further information for practicing the process of the invention employing various condensing recycle streams for enhanced cooling of the fluidized bed in the polymerization of hexene-1/butene-1/ethylene, ethylene/propylene, ethylene/butene-1, pentene-1/ethylene, as well as the use of iso-pentane as an inert fluid in the polymerization of butene-1/ethylene and ethylene, respectively.

|  | Example No. | | |
| --- | --- | --- | --- |
|  | 2 | 3 | 4 |
| Product | $C_2/C_4/C_6$ Copolymer | $C_2/C_3$ Copolymer | $C_2/C_4$ Copolymer |
| Recycle Stream Composition (mole percent): | | | |
| Nitrogen | 34.7 | 17.4 | 43.5 |
| Ethylene | 38.1 | 0.64 | 0.25 |
| Ethane | 8.9 | | |
| Propylene | | 63.5 | |
| Propane | | 16.5 | |
| Butene-1 | 5.1 | | 50.0 |
| Butane | | | 5.0 |
| Pentene-1 | | | |
| Isopentane | 1.0 | 1.0 | 0.5 |
| Hexene-1 | 4.8 | | |
| Hydrogen | 7.3 | 0.95 | 0.75 |
| Methane | 0.1 | | |
| Recycle Stream Dew Point (°C.)* | 63.0 | 44.4 | 44.0 |
| Reactor Inlet Temperature (°C.) | 54.3 | 43.5 | 41.6 |
| Liquid in Recycle Stream (wt. percent) | 4.8 | 4.2 | 8.8 |
| Reactor Temperature (°C.) | 88 | 60 | 50 |
| Reactor Pressure (psig) | 270 | 270 | 121 |
| Superficial Gas Velocity in Fluidized Bed (ft/sec) | 2.0 | 1.7 | 2.0 |
| Bed Height (feet) | 37 | 37 | 37 |
| Space Time Yield (lb/ft$^3$hr) | 5.5 | 6.6 | 4.0 |

|  | Example No. | | |
| --- | --- | --- | --- |
|  | 5 | 6 | 7 |
| Product | $C_5/C_2$ Copolymer | $C_4/C_2$ Copolymer | $C_2$ Homopolymer |
| Recycle Stream Composition (mole percent): | | | |
| Nitrogen | 40.7 | 15.7 | 37.5 |
| Ethylene | 35.0 | 38.6 | 35.0 |
| Ethane | 9.0 | 3.0 | 5.0 |
| Propylene | | | |
| Propane | | | |
| Butene-1 | | 17.7 | |
| Butane | | 2.3 | |
| Pentene-1 | 10.5 | | |
| Isopentane | | 14.2 | 10.5 |
| Hexene-1 | | | |
| Hydrogen | 3.8 | 6.2 | 11.0 |
| Methane | 1.0 | 2.3 | 1.0 |
| Recycle Stream Dew Point (°C.)* | 53.7 | 74.4 | 47.4 |
| Reactor Inlet Temperature (°C.) | 42.5 | 65.9 | 34.0 |
| Liquid in Recycle Stream (wt. percent) | 8.4 | 11.5 | 10.5 |
| Reactor Temperature (°C.) | 88 | 88 | 110 |
| Reactor Pressure (psig) | 270 | 270 | 270 |
| Superficial Gas Velocity in Fluidized Bed (ft/sec) | 2.0 | 2.0 | 2.0 |
| Bed Height (feet) | 37 | 37 | 37 |
| Space-Time-Yield (lb./ft$^3$hr) | 8.0 | 7.0 | 10.7 |

*At the pressure of the heat exchanger

EXAMPLE 8

A commercial, fluidized bed olefin polymerization reactor, in the bottom of which an annular disc inlet flow deflector of the type shown in FIGS. 2, 2A and 3 of the drawings was mounted, has been operated in condensing mode to produce a hexene copolymer of ethylene without problems. The dimensions were as follows: $d_m = 11.5$ ft. (3.51 m) mixing chamber diameter; L=8.3 ft. (2.54 m) diffusion mixing chamber height; $d_e = 23$ in. (0.58 m) inlet diameter; $d_o = 38$ in. (0.97 m) outer deflector diameter; $d_i = 13.9$ in. (0.35 m) inner deflector diameter; and h=3.9 in. (0.10 m) deflector stand-off distance. Four spacers were used to support the annular disc and to maintain the stand-off distance clearance (h) between the outer edge of the annular disc and the reactor bottom. The operating conditions and results obtained are set out in the table below.

No problem in reactor operation and no adverse effect on the quality of products, attributable to the annular disc, were observed. At a level of 9-10 percent by weight liquid in the recycle stream, there was no reactor operational instability during the run. This indicated that, at that level of condensation, the liquid was well entrained and carried into the fluidized bed as droplets without accumulating in the bottom head and flooding. The reactor was inspected and no fouling due to the excessive build-up of resin was observed.

TABLE

| | |
| --- | --- |
| ΔP bottom*(psi) | 5.2 |
| ΔP cooler (psi) | 6.0 |
| $T_{bed}$(°C.) | 95 |
| $P_{bed}$ (psig) | 305 |
| $U_{i(ft/sec)}$ (inlet velocity) | 79.2 |
| Superficial Gas Velocity in Fluidized Bed | 2.2 |
| $L_{fb}$(ft) (fluidized bed height) | 39 |
| L(ft) (mixing chamber height) | 8.33 |
| $d_m$(ft) (mixing chamber diameter) | 11.5 |
| Production Rate (KPPH) | 40 |
| Space-Time-Yield (lb/ft$^3$hr) | 9-10 |
| MI (melt index) | 0.83 |
| MFR (melt flow ratio) | 25 |
| ρ (g/cc) (resin density) | 0.926 |
| Ash (%) | 0.042 |
| $ρ_b$ (lbm/ft$^3$) (bulk density) | 27 |
| APS (in.)(av. particle size) | 0.027 |
| Liquid in Recycle Stream (weight | 9-10% | percent)

*ΔP bottom = Pressure drop across the annular disc inlet flow deflector + pressure drop across the distributor plate

EXAMPLES 9 AND 9a

In another example of the process of the invention, a fluidized bed gas phase commercial reactor was operated in both non-condensing and condensing modes of operation to produce a hexene-1/ethylene copolymer using the same catalyst and under the following conditions:

|  | 9<br>Non-condensing | 9a<br>Condensing |
|---|---|---|
| Production Rate, (pounds per hour) | 20,000 | 25,000 |
| $H_2$ Feed, (pounds per hour) | 10.3 | 12.9 |
| $C_2H_4$ Feed (pounds per hour) | 19,200 | 26,500 |
| $C_6H_{12}$ Feed, (pounds per hour) | 2,030 | 2,740 |
| Recycle Gas Flow, (thousands of pounds per hour) | 1,180 | 1,120 |
| Recycle Gas Velocity, In Bed and At Bed Temperature, (feet per second) | 2.2 | 2.1 |
| Recycle Gas Composition (Mole Percent) | | |
| $H_2$ | 6.2 | 7.4 |
| $CH_4$ | — | — |
| $N_2$ | 32.9 | 24.5 |
| $C_2H_4$ | 39.3 | 47.4 |
| $C_2H_6$ | 12.6 | 11.4 |
| $C_6H_{12}$ | 4.7 | 5.6 |
| $C_5H_{12}$ | 1.4 | 1.2 |
| Reactor Temperature (°C.) | 94.9 | 94.7 |
| Reactor Inlet Temperature (°C.) | 61.6 | 56.1 |
| Reactor Pressure, psig | 309.2 | 306.8 |
| Plate ΔP, psi | 5.5 | 5.4 |
| Bed Weight, pounds | 72,500 | 74,500 |
| Bed Volume, ft³ | 3,625 | 3,725 |
| Reactor Inlet Pressure, psig | 323.5 | 321.1 |
| Inlet Dewpoint (°C.) | 58.6 | 62.3 |
| Weight Percent Condensed Liquid in Recycle | 0 | 3.8 |
| Space-Time-Yield, (lb/hr-ft³) | 5.5 | 6.7 |

Comparing Examples 9 and 9a, a space-time-yield of 6.7 lb/hr-ft³ was obtained in the condensing mode of operation with 3.8 percent of the recycle stream condensed compared with 5.5 lb/hr-ft³ for the noncondensing mode of operation. This is an improvement of 22 percent.

EXAMPLES 10 AND 10a

In a further example of the process of this invention, a fluidized bed gas phase commercial reactor was operated in both non-condensing and condensing modes of operation to produce a butene-1/ethylene copolymer under the following conditions:

|  | 10<br>Non-Condensing | 10a<br>Condensing |
|---|---|---|
| Production Rate, (pounds per hour) | 7,300 | 11,800 |
| $H_2$ Feed, (pounds per hour) | 2.5 | 4 |
| $C_2H_4$ Feed, (pounds per hour) | 6,220 | 11,100 |
| $C_4H_8$ Feed, (pounds per hour) | 770 | 1,280 |
| Recycle Gas Flow, (thousands of pounds per hour) | 767 | 468 |
| $C_5H_{12}$ Feed, (pounds per hour) | 490 | 730 |
| Recycle Gas Flow, (thousands of pounds per hour) | 767 | 468 |
| Recycle Gas Velocity, (feet per second) | 2.57 | 1.61 |
| Recycle Gas Composition (Mole Percent) | | |
| $H_2$ | 7.0 | 9.0 |
| $CH_4$ | 0.3 | 0.3 |
| $N_2$ | 19.3 | 16.3 |
| $C_2H_4$ | 42.7 | 44.6 |
| $C_2H_6$ | 2.3 | 2.4 |
| $C_4H_8$ | 15.7 | 16.2 |
| $C_4H_{10}$ | 0.2 | 0.2 |
| $C_5H_{12}$ | 13.3 | 12.9 |
| Reactor Temperature, (°C.) | 85.1 | 85.1 |
| Reactor Inlet Temperature, (°C.) | 68.6 | 53.5 |
| Reactor Pressure, psig | 269.4 | 264.9 |
| Plate ΔP, psig | 14.4 | 6.6 |
| Total Bed ΔP, psig | 4.6 | 4.6 |
| Reactor Inlet Pressure, psig | 284.5 | 276.2 |
| Bed Volume, ft³ | 1,900 | 1,900 |
| Inlet Dewpoint, (°C.) | 66.2 | 63.3 |
| Weight Percent Condensed Liquid in Recycle | 0 | 14.3 |
| Space-Time-Yield, lb/hr-ft³ | 3.8 | 6.2 |

In Examples 10 and 10a, a space-time-yield of 6.2 lb/hr-ft³ was obtained with 14.3 percent of the recycle stream condensed compared with 3.8 lb/hr-ft³ for the non-condensing mode of operation. This is an improvement of 63 percent.

EXAMPLES 11 AND 11a

The following examples 11-11a in tabular form set forth further information for practicing the process of the invention in the polymerization of vinyl chloride to form polyvinyl chloride.

|  | 11<br>Without Condensation | 11a<br>With Condensation |
|---|---|---|
| Recycle Stream Composition (mole percent) | | |
| Nitrogen | 68 | 68 |
| Vinyl Chloride | 32 | 32 |
| Recycle Stream Dewpoint (°C.)* | 43 | 43 |
| Reactor Inlet Temperature (°C.) | 45 | 41.5 |
| Liquid in Recycle Stream (weight percent) | 0 | 3.1 |
| Reactor Temperature (°C.) | 60 | 60 |
| Reactor Outlet | 300 | 300 |

-continued

|  | 11<br>Without<br>Condensation | 11a<br>With<br>Condensation |
|---|---|---|
| Pressure (psig) | | |
| Superficial Gas<br>Velocity in<br>Fluidized Bed (ft/sec) | 2.0 | 2.0 |
| Bed Height (feet) | 37 | 37 |
| Space-Time-Yield<br>(lb/ft$^3$-hr) | 3.9 | 6.6 |

*At the pressure of the heat exchanger

EXAMPLES 12 AND 12a

The following examples 12–12a in tabular form set forth further information for practicing the process of the invention in the polymerization of propylene to form a polypropylene homopolymer product.

|  | 12<br>Without<br>Condensation | 12a<br>With<br>Condensation |
|---|---|---|
| Recycle Stream<br>Composition (Mole<br>Percent) | | |
| Hydrogen | 3.6 | 3.6 |
| Nitrogen | 24.6 | 24.6 |
| Propylene | 63.4 | 63.4 |
| Propane | 8.4 | 8.4 |
| Recycle Stream<br>Dewpoint (°C.)* | 54.1 | 54.1 |
| Reactor Inlet<br>Temperature (°C.) | 56.1 | 53.4 |
| Liquid in Recycle<br>Stream (weight percent) | 0 | 3.2 |
| Reactor Temperature (°C.) | 60 | 60 |
| Reactor Outlet<br>Pressure (psig) | 510 | 510 |
| Superficial Gas<br>Velocity in<br>Fluidized Bed (ft/sec) | 1.6 | 1.6 |
| Bed Height (feet) | 37 | 37 |
| Space-Time-Yield<br>(lb/ft$^3$hr) | 2.1 | 5.1 |

*At the reactor inlet pressure

The space time yield improvements achieved by the practice of this invention are the result of the increased cooling capacity of the recycle stream. This increased capacity is due both to the greater temperature differential between the entering recycle stream and the bed temperature and to the evaporation of condensed liquid entrained in the recycle stream.

It will be appreciated that increased cooling is achieved by virtue of both the lower temperature of the recycle stream and the heat of vaporization of the liquid, whether the liquid is introduced via condensation of a portion of the recycle stream or separate injection.

Although the process of the invention can be applied to increase the production rate from existing and new commercial reactors, the invention also has the potential of reducing equipment cost in new reactors. For example, plants designed according to the prior art for the production of certain ethylene copolymers made using hexene-1 must have larger diameter reactors due to the lower space time yield. Since this invention increases the space time yield for products made with hexene-1 to that of conventional butene-1/ethylene copolymers, the extra cost associated with the larger diameter reactor can be eliminated by practicing the present invention. Furthermore, the volume of recycle gas can be reduced (while maintaining the same gas velocity) resulting in capital savings because of the smaller compressor required, as well as lower operating costs.

Advantages of this invention over other heat removal methods which use condensed liquids include the simplicity of this invention, good liquid distribution, maximum heat removal, and uniform gas stream composition in the polymerization zone as a result of introducing the recycle stream in the lower regions of the reactor. No liquid collection, separation, or injection equipment is required. Additionally, liquids are dispersed in the stream entering the fluidized bed over the entire cross-sectional area, avoiding temperature gradients and high local concentrations of liquid around injection means.

What is claimed is:

1. In a continuous gas fluidized bed process for the production of polymer by continuously passing a gaseous stream comprising monomer through a fluidized bed in a reaction zone in the presence of catalyst under reactive conditions, withdrawing from said reaction zone polymer product and a stream comprising unreacted gases and solid particles, cooling said stream and recycling said cooled stream to said reaction zone together with sufficient additional monomer to replace monomer polymerized and withdrawn as polymer product, the improvement comprising cooling at least a part of said recycle stream to condense a portion thereof and form a liquid-containing mixture wherein the weight ratio of liquid to solid particles is not less than about two to one, and introducing said mixture into said reaction zone wherein the liquid in said mixture is vaporized.

2. An improved process according to claim 1 wherein said recycle stream comprising unreacted gases and solid particles is compressed prior to cooling.

3. An improved process according to claim 1 wherein means are provided to maintain said liquid entrained in said mixture until said liquid is vaporized.

4. An improved process according to claim 1 wherein an inert condensible fluid is present in said mixture to raise the dew point of said mixture.

5. An improved process according to claim 4 wherein said inert condensible fluid is a saturated hydrocarbon.

6. An improved process according to claim 1 wherein said liquid in said mixture comprises from 2 to about 20 percent by weight of the total weight of said mixture.

7. An improved process according to claim 6 wherein said liquid in said mixture comprises from 2 to about 12 percent by weight of the total weight of said mixture.

8. An improved process according to claim 1 wherein said mixture is divided into at least two separate streams at least one of which is introduced into the reactor at a point below the reaction zone and one or more of said separate streams is optionally introduced directly into said reaction zone, provided that the velocity of all gases introduced below said reaction zone is at least sufficient to support said fluidized bed and to maintain it in a fluidized condition.

9. An improved process according to claim 1 wherein the gas stream flowing upwardly through the fluidized bed is generally uniform in composition and moving in a manner through said fluidized bed such that the entire fluidized bed is maintained in a gas fluidized condition and with essentially no dead spaces through which gases do not pass.

10. An improved process according to claim 1 wherein said additional monomer is introduced into said reactor in liquid form below the reaction zone.

11. An improved process according to claim 1 wherein said additional monomer is introduced into said recycle stream prior to entry of said recycle stream into said reactor.

12. An improved process according to claim 1 wherein gas distributor means is provided immediately below the fluidized bed and above the region where said recycle stream is introduced into said reactor.

13. An improved process according to claim 1 wherein the internal pressure within said reactor is from about 250 psig to about 500 psig.

14. An improved process according to claim 1 wherein said monomer is an alpha olefin monomer having from two to four carbon atoms alone or in admixture with one or more other alpha olefin monomers having from two to eight carbon atoms.

15. An improved process according to claim 14 wherein said monomer is ethylene alone or in admixture with one or more other alpha olefin monomers having from two to eight carbon atoms.

16. An improved process according to claim 14 wherein said monomer is propylene alone or in admixture with one or more other alpha olefin monomers having from two to eight carbon atoms.

17. An improved process in accordance with claim 1 wherein said monomer is vinyl chloride.

18. A method for controlling the temperature of the reaction zone during the production of polymer from monomer in a gas fluidized bed by an exothermic polymerization reaction comprising continuously introducing a monomer-containing stream comprising a gas phase and a liquid phase into the bottom of said bed where said liquid phase is vaporized, said liquid phase comprising from 2 to about 20 weight percent of said stream and the weight ratio of liquid to any solid particles in said stream is not less than about two to one.

19. A method according to claim 18 wherein a supplemental liquid is introduced into the reaction zone at one or more levels above the region of lower temperature at the bottom of said fluidized bed.

20. A process for producing polymer from monomer by an exothermic polymerization reaction in a reaction zone containing a bed of gas fluidized growing polymer particles which comprises:
   (1) continuously passing a gaseous stream comprising monomer through said reaction zone with an upward velocity sufficient to maintain said particles in a suspended and gas fluidized condition;
   (2) introducing a polymerization catalyst into said reaction zone;
   (3) withdrawing polymer product from said reaction zone;
   (4) continuously withdrawing a stream comprising unreacted gases from said reaction zone, compressing and cooling said stream to a temperature below the dew point of said stream to form a mixture comprising a gas phase and a liquid phase, said liquid phase comprising from 2 to about 20 weight percent of said stream and wherein the weight ratio of liquid to any solid particles in said stream is not less than about two to one; and
   (5) continuously introducing said mixture into the bottom of said reaction zone wherein said liquid phase is vaporized.

21. A process according to claim 20 wherein an inert, condensible fluid is present in said mixture to raise the dew point of said mixture.

22. An improved process according to claim 21 wherein said inert, condensible fluid is a saturated hydrocarbon.

23. A process according to claim 20 wherein said liquid phase of said mixture comprises from 2 to about 12 percent by weight of the total weight of said mixture.

24. A process according to claim 20 wherein the velocity of said stream and the amount of gas in said stream are maintained at levels sufficient to maintain said liquid entrained in said gas until vaporized.

25. A process according to claim 20 wherein the stream flowing upwardly through the fluidized bed is generally uniform in composition and moving in a manner through said bed such that the entire bed is maintained in a fluidized condition and with essentially no dead spaces through which gases do not pass.

26. A process according to claim 20 wherein additional monomer in liquid or gaseous form is added below the reaction zone to replace monomer polymerized and withdrawn as product.

27. A process according to claim 20 wherein additional monomer is added to replace monomer polymerized and withdrawn as product by injection into said stream prior to entry of said stream into the reactor.

28. A process according to claim 20 wherein gas distributor means is provided immediately below said reaction zone.

29. A process according to claim 20 wherein the internal pressure within said reactor is from about 250 psig to about 500 psig.

30. A process according to claim 20 wherein said polymer is produced by reaction of an alpha olefin monomer having from two to four carbon atoms alone or in admixture with one or more other alpha olefin monomers having from two to eight carbon atoms.

31. An improved process according to claim 30 wherein said monomer is ethylene alone or in admixture with one or more other alpha olefin monomers having from two to eight carbon atoms.

32. An improved process according to claim 31 wherein said monomer is propylene alone or in admixture with one or more other alpha olefin monomers having from two to eight carbon atoms.

33. An improved process according to claim 20 wherein said polymer is produced from vinyl chloride monomer.

* * * * *